March 28, 1961  R. B. WALDER  2,977,430
STARTER CONTROL DEVICE FOR AUTOMOTIVE VEHICLES
Filed May 22, 1956  4 Sheets-Sheet 1

INVENTOR.
Robert B. Walder.
BY
Barnes, Dickey & Pierce,
ATTORNEYS.

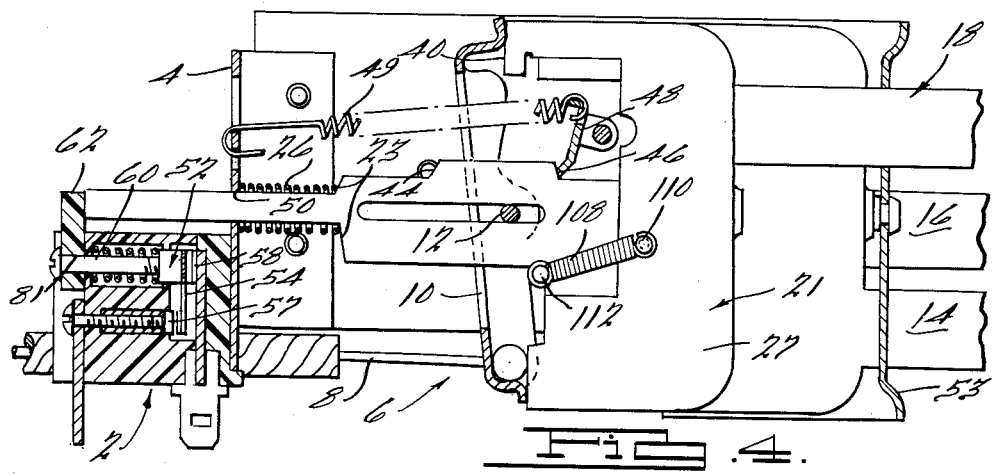

March 28, 1961 R. B. WALDER 2,977,430
STARTER CONTROL DEVICE FOR AUTOMOTIVE VEHICLES
Filed May 22, 1956 4 Sheets-Sheet 3
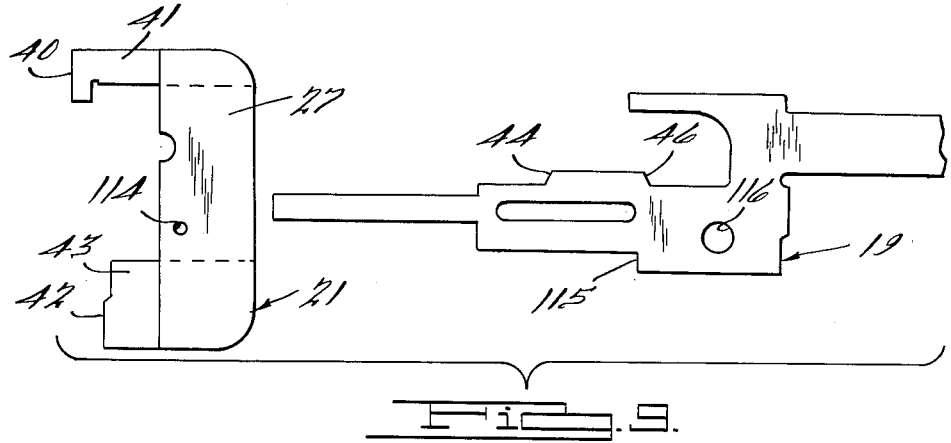
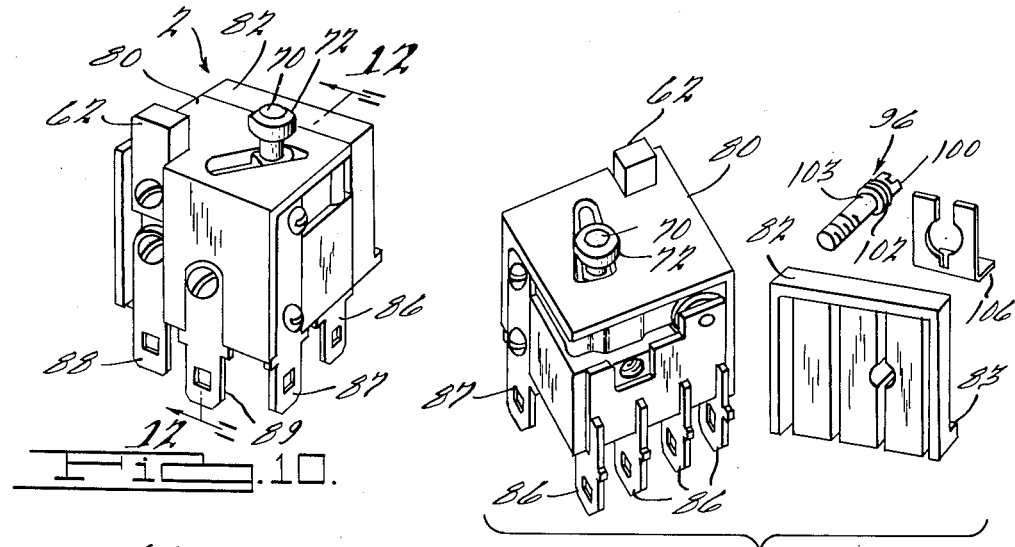
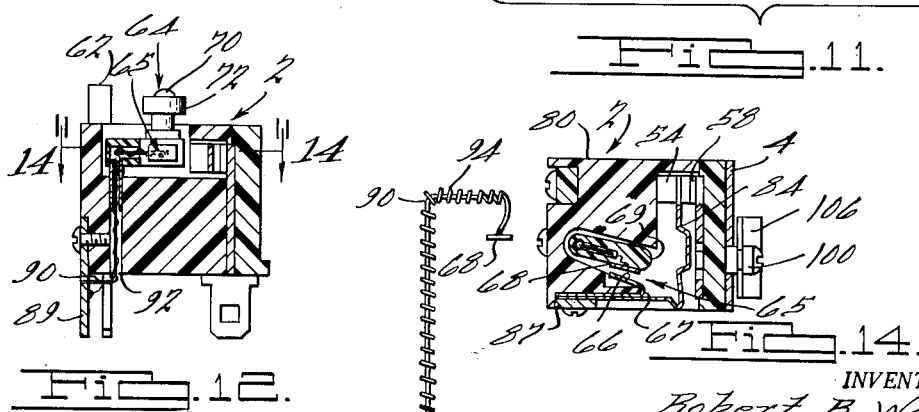
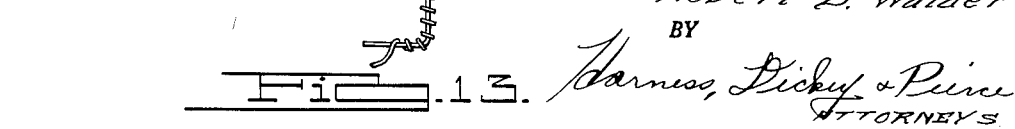
INVENTOR.
Robert B. Walder
BY
Harness, Dickey & Pierce
ATTORNEYS March 28, 1961 R. B. WALDER 2,977,430
STARTER CONTROL DEVICE FOR AUTOMOTIVE VEHICLES
Filed May 22, 1956 4 Sheets-Sheet 4
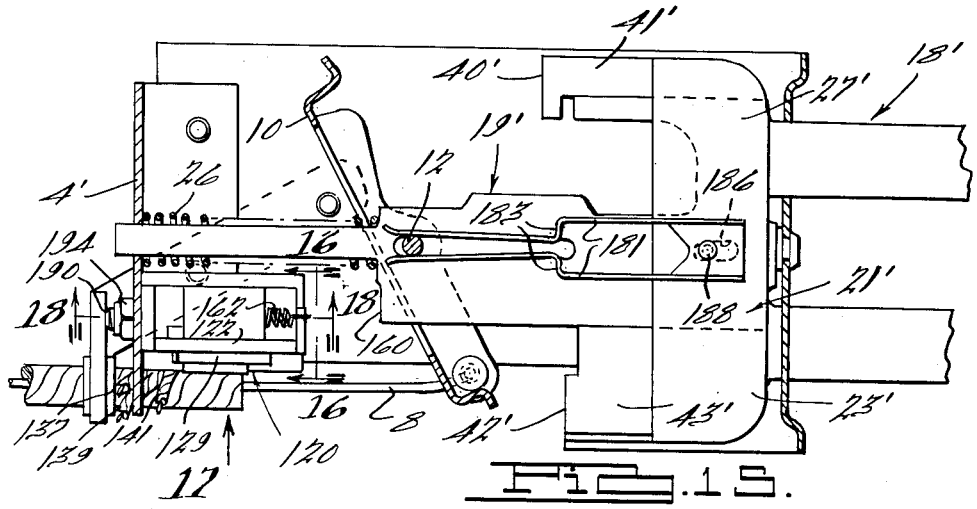
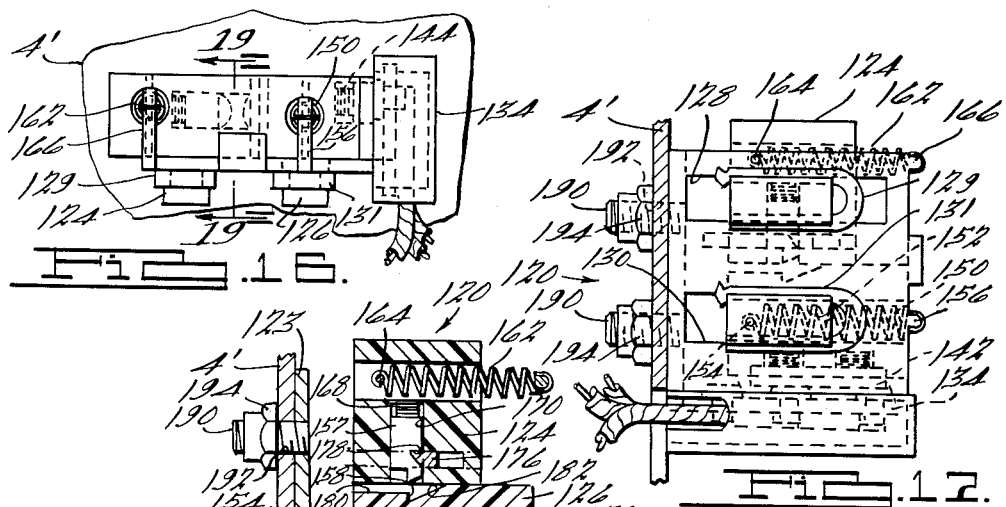
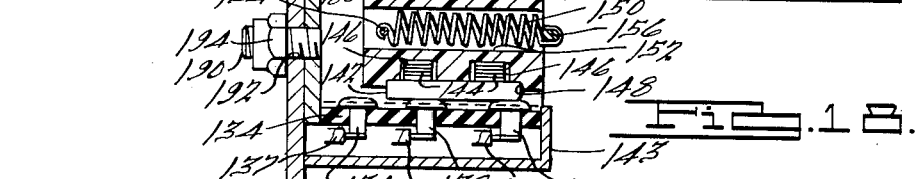
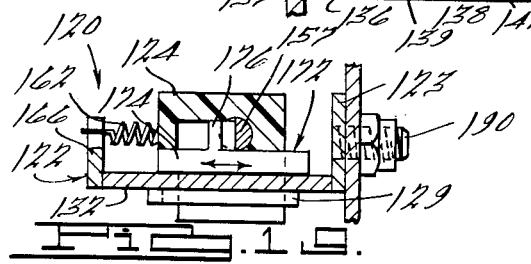
INVENTOR.
Robert B. Walder
BY
Harness, Dickey & Pierce
ATTORNEYS United States Patent Office 2,977,430
Patented Mar. 28, 1961

2,977,430

STARTER CONTROL DEVICE FOR AUTOMOTIVE VEHICLES

Robert B. Walder, Center Line, Mich., assignor to Chrysler Corporation, Highland Park, Mich., a corporation of Delaware Filed May 22, 1956, Ser. No. 586,569

6 Claims. (Cl. 200—16)

This invention relates to improved electrical switching and transmission control mechanisms and more particularly to such mechanisms for motor vehicles having so-called push-button transmission control means to control the various positions of the transmission.

Many automobiles equipped with automatic transmissions are also provided with electrical interlock circuits connected between the transmission control mechanism and the starter switch to prevent energization of the starter motor when the transmission is engaged or in a driving position. In vehicles having hand-operated means to energize the starter motors, the interlock circuit may introduce undesirable confusion and delay in starting the vehicle engine if it stalls in traffic when the transmission is engaged, since the driver of the vehicle must first shift the transmission to release the interlock and then energize the starter motor. The problem is accentuated in automobiles having push-button transmission control assemblies located on one side of the steering wheel and having starter energizing means located on the opposite side of the steering wheel. In such vehicles, particularly when they are under way, if the engine stalls the driver must first release the steering wheel with one hand to push a transmission control button, then regrasp the steering wheel with that hand and reach with his other hand to energize the starter motor to restart the motor. Then, in order to re-engage the transmission, he must bring his hand back to the steering wheel, and release the steering wheel again with the first hand to operate the push button again to put the vehicle in motion. All this not only can delay the operation of the vehicle and the restarting of the engine, but also can be fairly confusing to a driver, particularly one who is relatively inexperienced at handling this type of control and unfamiliar with electrical interlock arrangements.

Accordingly, one object of the invention is to facilitate engine starting in vehicles having push-button controlled transmissions. Another object is to provide switching means directly connected to and actuated by a transmission control assembly for starting the engine of a vehicle.

These and other objects are accomplished by the instant invention, one embodiment of which comprises a spring biased switch assembly adapted to be mounted upon and actuated by operative parts of a transmission control assembly of an automotive vehicle. One section of the switch assembly comprises a double throw switch spring biased toward one contact position and including an actuating member positioned to be actuated by over-travel of a part of the transmission control assembly when the transmission is in its disengaged, or neutral position. When actuated, this switch disconnects the accessory circuits and energizes the starter motor relay to actuate the starter motor. The assembly also includes a single throw switch biased toward its open position and having a projecting actuating member positioned to be actuated by a part of the transmission control assembly when the transmission is in its reverse position. When the single throw switch is actuated, it completes a circuit to energize the reverse lamps (back-up lights) mounted upon the rear of the vehicle. The entire assembly is comprised in a single, self-contained unit adapted to be mounted upon and actuated by the transmission control mechanism.

The invention will be described in greater detail in connection with the accompanying drawings of which:

Fig. 4 is generally similar to Fig. 3 but shows the assembly in a different position;

Fig. 5 is a similar view to Figs. 3 and 4 but showing the assembly in a third position;

Fig. 6 is a cross-sectional, plan view of a portion of the device shown in Fig. 2, taken along the section line 6—6 thereof;

Fig. 7 is a cross-sectional view of a portion of a switch assembly according to the invention, particularly illustrating the mounting means by which the assembly is mounted upon the transmission control mechanism;

Fig. 8 is a horizontal cross-sectional view of a portion of the device shown in Figs. 1–3 with the transmission control assembly in its reverse actuating position;

Fig. 9 is a side elevational view showing the disassembled parts of one of the actuating elements of the transmission control assembly shown in Figs. 1–5;

Fig. 10 is a perspective view of the switch assembly according to the invention dismounted from its position upon a transmission control assembly Fig. 11 is a perspective view of a partially disassembled switch assembly according to the invention;

Fig. 12 is a cross-sectional view of the switch assembly shown in Fig 10 taken along the section lines 12—12 thereof;

Fig. 13 is a side elevational view of a biasing spring and conductor assembly for the single pole, single throw switch of the switch assembly shown in Figs. 10 and 11;

Fig. 14 is a horizontal cross-sectional view of the switch assembly shown in Fig. 12, taken along the section line 14—14 thereof;

Fig. 15 is a vertical cross-sectional view of a push-button transmission control assembly including a starter control switch according to a second embodiment of the invention;

Fig. 16 is a cross-sectional view, partly in elevation, of the device shown in Fig. 15, taken along the section line 16—16 thereof;

Fig. 17 is a fragmentary bottom view of the device shown in Fig. 15 looking in the direction of the arrow 17 thereof;

Fig. 18 is a cross-sectional view of the starter switch as shown in Fig. 15, taken along the section line 18—18 thereof; and Fig. 19 is a vertical cross-sectional view of the starter switch as shown in Fig. 16, taken along the section line 19—19 thereof.

Figure 1:
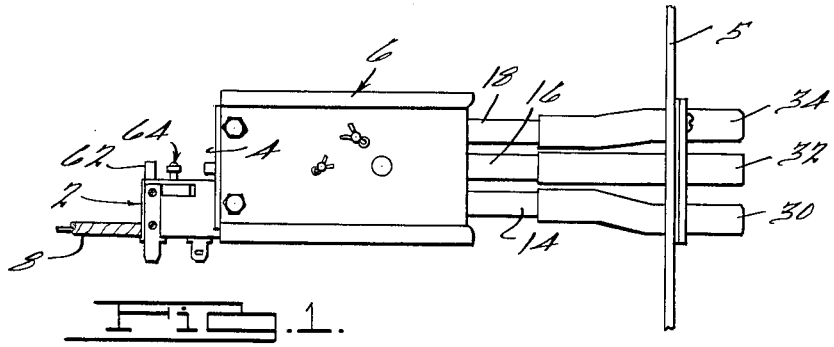
Figure 1 is a side elevational view of a push button transmission control assembly including a switch assembly according to the instant invention mounted thereon.
Figure 2:
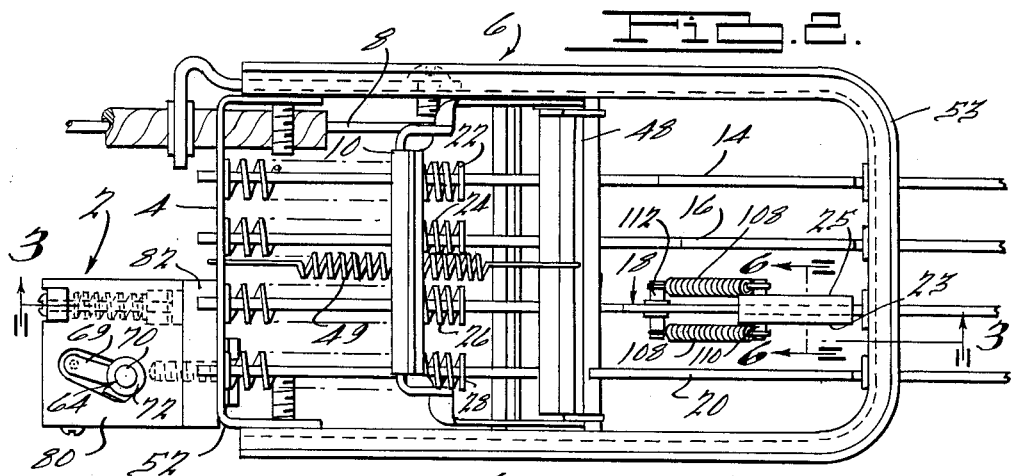
Fig. 2 is a plan view of the device shown in Fig. 1.

Referring now to the drawings, and particularly to Figs. 1–5 thereof, one embodiment of the invention comprises a spring biased switch assembly 2 adapted to be rigidly secured upon the rear housing plate 4 of a conventional push button actuated transmission control assembly 6. The control assembly 6 may be mounted upon the instrument panel 5 of a vehicle by any convenient means (not shown) and includes a centrally pivoted treadle bar 10 which may be selectively positioned in any of a number of desired angular positions by operating bars 14, 16, 18 and 20 to control the position of a shift lever upon the transmission assembly (not shown) of the vehicle through a Bowden wire 8. The operating bars are urged toward their retracted, non-operative positions by coil springs 22, 24, 26 and 28, held in compression between the rear wall 4 and shoulder portions 23 of the respective bars. The bars are separately connected to individual push buttons 30, 32, 34 and 36, respectively, each of the push buttons denoting a different position of the transmission shift lever. Each of the operator bars 14, 16, 18 and 20 comprises a flat plate having an elongated, central shaft portion, such as the central shaft 19 of the operator bar 18 shown in Figs. 3, 4, 5 and 9. Each of the operator bars also includes a pair of positioning shoulders, such as the shoulders 40 and 42 of the bar 18 adapted to contact the treadle bar 10 when the operator bar is advanced and to force the treadle bar into a desired position. Three of the operator bars 14, 16 and 20 may be formed of single pieces of flat sheet metal. The fourth operator bar 18, however, is specially constructed, according to the invention, as described in greater detail hereinafter, to provide overtravel of the shaft 19 with respect to the shoulders 40 and 42.

The central shaft portions of the operator bars are shaped to form locking and release shoulders 44 and 46 which cooperate with a pivoted latch plate 48 releasably to lock the operator bars into their advanced positions in engagement with the treadle bar 10. The forward shoulder 44 swings the latch plate 48 open when the operator bar advances to release any other operator bar that may be held by the latch plate 48. The rear shoulder 46 engages the latch plate 48 after the operator bar has been fully advanced to hold the operator bar in position against the rearward urge of its biasing spring 22, 24, 26, or 28. The latch plate 48 is urged toward engagement with the operator bars by a tension spring 49 connected between the latch 48 and the rear housing plate 4.

The operator bars 14, 16, 18 and 20 are slidably supported in slots 50 in the rear housing plate 4 and in slots 51 in the front housing plate 53 of the control assembly 6, and when the operator bars are advanced they project beyond the rear plate 4. A switch assembly 2, according to the invention, is mounted upon the rear housing plate 4 of the control assembly and includes projecting members 62 and 64 actuated by selected ones of the operator bars when they are advanced. The entire switch assembly is contained in a single, two-piece block-like housing (not separately designated) which is preferably made of an insulating material such as a molded resin. The operative elements of the switch assembly are all mounted within the major portion 80 (Fig. 11) of the block which may be generally cubic in outline, and is suitably apertured and grooved to hold the various elements firmly in position.

Figure 3:
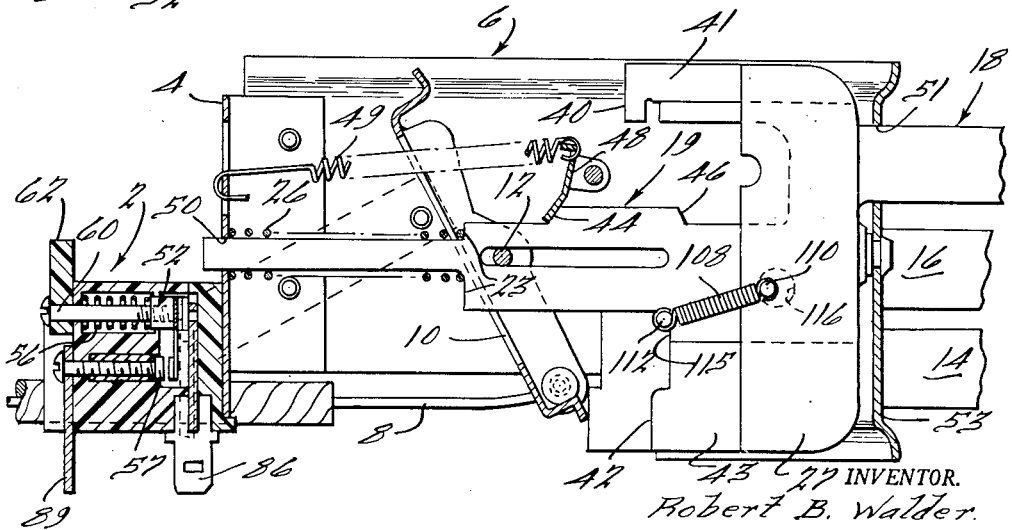
Fig. 3 is a cross-sectional view of the device shown in Figs. 1 and 2, taken along the section line 3—3 of Fig. 2 and showing the assembly in one position.

As most clearly shown in Figs. 3, 4 and 5, the switch assembly includes a double throw switch 52 comprising a movable contact arm 54 rigidly mounted within the housing portion 80 upon a shaft 60, which may be a machine screw as shown and which is slidably mounted in the housing portion 80. The shaft 60 extends exteriorly of the housing portion 80 through an aperture 81, and carries an actuating lug, or arm 62 which projects angularly from the shaft 60 and extends above the top of the housing portion 80. At its interior end, adjacent to the contact arm 54, the shaft 60 is enlarged to provide a shoulder 55 to retain a biasing spring 56 which may be a coil spring coaxially disposed around the shaft 60 and held in compression between the shoulder 55 and the wall of the housing portion 80. This spring 56 urges the shaft 60 inwardly into the housing portion 80 so that, as shown in Figs. 3 and 4, the arm 54 is normally pressed against one fixed contact 58 of the switch. When the shaft 60 is actuated against the urging of the spring 56 and moved outwardly with respect to the housing portion 80, it draws the arm 54 away from the fixed contact 58 and into engagement with a second fixed contact 57.

The contact arm may be connected to one terminal of the electrical supply of the vehicle through a flexible lead 84 (Fig. 14) which is connected between the arm 54 and a terminal 87 mounted upon the housing portion 80. The first fixed contact 58 is directly connected to a unitary series of connector tabs 86 which project from the housing portion 80 and to which electrical accessories such as radios, air blowers, and the like may be connected. The second fixed contact 57 is connected to a single, exteriorly projecting connector tab 88 to which one terminal of the engine starting relay may be connected. Thus, when the switch arm 54 is in its normal position, it closes one portion of an electrical circuit to energize the accessories that are connected to the tabs 86, and when the arm 54 is moved to its actuated position it positively disables these accessories by breaking the circuit and energizes the starting relay by completing the circuit from the power supply through the second fixed contact 57.

The actuating arm 62 projects above the top of the housing portion 80 and is aligned with the shaft 19 of the neutral operator bar 18 of the transmission control assembly 6. The arm 62 is mounted at the rear of the switch assembly 2 and is spaced from the wall 4 a distance such that when the operator bar 18 is extended into its advanced position it approaches the arm 62 but does not actuate the switch 52. An overtravel motion, which will presently be described in greater detail, is provided in the operator bar 18 so that it may be advanced beyond its normal advanced position to actuate the switch 52 to energize the engine starting motor.

The switch assembly 2 also includes a single throw switch generally designated 65 and shown most clearly in Figs. 12–14. The switch 65 comprises a single pair of adjacent contacts 66 and 68, the first contact 66 being fixedly mounted upon the housing portion 80, and the second contact 68 being affixed to a pivoted arm 69. The arm 69 is mounted upon a torsion bar spring 90, which extends vertically through an aperture 92 in the housing and is arranged to urge the arm 69 away from the first contact 66 to hold the switch 65 in its normally open position. A conductive pigtail 94 is connected between the second contact 68 and a connecting tab 89 to which the rear, or "back-up" lights may be connected. This pigtail 94 is preferably passed through the aperture 92, and spiralled around the spring shaft 90 to prevent binding or jamming and to facilitate assembly of the device. The first contact 66 is connected by a short copper strap 67 to the input terminal tab 87, which, as heretofore stated, may be connected to the main electrical power supply of the vehicle, and preferably through the ignition switch.

Thus, when both the ignition switch and the single throw switch 65 are closed, the back-up lights are energized to illuminate the field of vew at the rear of the vehicle. A roller 72 is mounted upon a pin 70 on the arm 69 and projects from the switch assembly in alignment with the reverse operating bar 20 of the transmission control assembly so that when the reverse push button is advanced the operating bar 20 strikes the roller 72 to deflect the arm 69 and close the switch 64 to energize the back-up lights. In Fig. 8, the switch 65 is shown in its closed position with the operating bar 20 advanced and deflecting the roller 72.

The switch assembly housing also includes a face plate 82 (see Fig. 11) which is slotted to fit over and engage the accessory lugs 86, holding them securely in place. An outwardly projecting flange 83 is formed on the lower edge of the face plate 82 to assist in positioning the switch assembly upon the rear plate 4 of the transmission control assembly 6. The face plate 82 is secured to the body portion 80 by a screw 96 which is provided with an elongated head 100 bearing a circumferential groove 102. The diameter of the head 100 is selected the slide. The contact plate 142 maintains constant contact with the central contact 138, and is reciprocable back and forth with the slide 126 alternately to contact one or the other of the end contacts 136 and 140. The slide 126 is biased toward a retracted position by a coil spring 150 which is partly housed within a socket-like recess 152 in the slide 126, and which is held in tension between a pin 154 mounted in the slide 126 and a post 156 at the rear of the frame 122. When the slide 126 is retracted, the contact plate 142 electrically connects the two contacts 138 and 140 and closes a circuit in which certain electrically operated accessories may be connected, the central contact 138 being connected to one terminal of the vehicle's electrical power supply, and the contact 140 being connected to the line supplying the accessories. The other end contact 136 is connected to the starter motor relay so that when the plate 142 connects the contact 136 with the central contact 138 the relay is energized. When the slide 126 is advanced against the urging of the spring 150, the contact plate 142 is carried forwardly, breaking the accessories' circuit and closing the starter relay circuit.

The contact slide 126 is actuated through the actuator slide 124 by means of a trigger controlled pawl 157 slidably mounted within the actuator slide 124 and positioned to engage a notch 158 in the contact slide 126. The actuator slide 124 is positioned to be abuttingly engaged by a shoulder 160 on the shaft 19' of the neutral operator bar 18', and is urged toward its retracted position by a tensioned coil spring 162 held between a pin 164 in the slide 124 and a post 166 formed at the rear of the frame 122. The pawl 157 is biased toward engagement with the contact slide 126 by a compression spring 168 mounted behind the pawl in its socket 170. The pawl 157 is normally locked in its retracted position, compressing the spring 168, by a trigger 172 which is slidably mounted longitudinally in the slide 124 and actuatable by the movement of the slide 124. The trigger 172 includes an elongated bar portion 174 (see Fig. 19) which is positioned in a guideway (not separately designated) beneath the pawl 157 in the slide 124, and which is substantially longer than the slide 124. As the slide 124 is reciprocated back and forth between the legs of the frame 122, the bar portion 174 strikes the frame and is reciprocated thereby with respect to the slide 134. The trigger 172 also includes a pawl portion 176 projecting upwardly from the bar portion 174 to engage the pawl 157 by means of a notch 178 formed therein.

In Fig. 18, the contact slide 126 is shown fully retracted, the actuating slide 124 being partially, but not fully advanced. When the actuating slide 124 is advanced from this position, the bar portion 174 of the trigger strikes and is held against movement by the forward leg 123 of the frame 122, and the pawl 157 is drawn away from the pawl portion 176 of the trigger 172. By the time the slide 124 reaches the limit of its travel the pawl 157 is released and falls against the adjacent surface 180 of the contact slide 126. After the pawl 157 is released by this trigger action and the actuating slide 124 is partially retracted to the position shown in Fig. 18, the pawl 157 falls into the contact slide notch 158, thus engaging the contact slide 126 and enabling the actuating slide 124 to carry the contact slide 126 forwardly upon its next advance. After the pawl 157 is released from the trigger 172, it may be relocked by merely allowing the spring 162 to fully retract the slide 124. The pawl 157 is then cammed back into the socket 170 by the sloping portion 182 of the notch 158 and positioned to receive the pawl portion 176 of the trigger, which is driven into the notch 178 by the travel of the slide 124 after the bar portion 174 strikes the rear leg of the frame 122.

The actuator slide 124 is aligned with the neutral push button shaft 19', and when this shaft 19' is fully retracted, as is the case when the transmission is in a drive position, the actuator slide 124 is fully retracted by the spring 162 and the pawl 157 is locked by the trigger 172. When the neutral push button is first advanced to shift the transmission into neutral, the shaft 19' engages and fully advances the actuator slide 124 to release the pawl 157. When the neutral push button is thereafter released, the shaft 19' retracts slightly as permitted by a lost motion arrangement, which will presently be described in greater detail, and permits the actuator slide 124 to retract sufficiently far to carry the pawl 157 behind the notch 158. If now the neutral push button is again fully advanced, it engages and advances the actuator slide 124 again, but this time the pawl 157 is advanced into the notch 158 and carries the contact slide 126 forward with the actuator slide 124 to energize the starter motor circuit. If, on the other hand, some other push button of the assembly 6' is advanced, to release the neutral push button and permit it to retract fully, the actuator slide 124 also retracts and the pawl 157 is again retracted and locked by the trigger 172. Thus, in normal operation, the contact slide 126 is not advanced by a single, full advance of the neutral push button 34, and the transmission control assembly 6' may be forcibly operated without danger of accidental energization of the starter relay through overly enthusiastic operation of the neutral push button.

The overtravel arrangement for the neutral push button shaft 19' is different when used in conjunction with the switch 120 from the arrangement used with the switch 2 as hereinabove described. The difference arises because of the difference in action between the two embodiments of the invention, the first switch 2 being actuated upon advance of the shaft 19 beyond the position in which the shoulders 40 and 42 engage the treadle bar 10, and the second switch 120 being actuated when the shaft 19' is advanced only to this position, not beyond it.

Each operator bar, such as the bar 18' (Fig. 15) of the assembly 6' is provided with a pair of bent spring members 181 which engage the treadle bar pivot pin 12 to latch the respective bars in their advanced positions when the push buttons are actuated. These spring members 181 perform the function of the latch plate 48 used in the assembly 6, heretofore described. The spring members 181 may be made of any resilient material such as Phosphor bronze, and are bent to form retaining shoulders 183 by which they resiliently and releasably engage the pivot pin 12 when the bar 18' is advanced. When, after one operator bar has been locked by the spring members 181 in its advanced position, a second bar is advanced, the second bar forces the treadle bar 10 into a new position, thereby exerting sufficient retractive force on the first bar to spread apart the spring members 181 and to cause them to release the pivot pin 12. The first bar is then returned to its fully retracted position by the biasing spring.

This spring latching arrangement, however, forms no part of the present invention, being shown only to illustrate a second type of push-button transmission control. The switch 120 is equally useful with the assembly 6 shown in Figs. 1–5, and with other types of push-button assemblies.

For use with the switch 120 the neutral operator bar 18' is modified to provide for lost motion between the shaft 19' and the treadle bar abutment shoulders 40 and 42. The arrangement may be generally similar to the consruction of the operator bar 18, hereinabove described, except that no resilient drive means such as the springs 108 are connected between the shaft 19' and the cross member 21'. A longitudinal slot 186 is formed in the shaft 19'. A pin 188 extending through the slot 186 and rigidly secured to both plates 25' and 27' of the cross member 21' constitutes the sole driving connection between the shaft 19' and the cross member 21'. As in the structure heretofore described, the cross member 21' carries a pair of shoulder members 41' and 43' which strike and position the treadle bar 10 when the cross member 21' is advanced. In the present structure, the to fit within an aperture 104 in the rear plate 4 of the transmission control assembly (see Fig. 7) and the entire switch assembly 2 may be firmly but removably secured to the plate 4 by a spring clip 106 snapped into the screw groove 102. The length of screw head 100 between the thread shoulder 103 and the groove 102 is about the same as the thickness of the rear plate 4 of the transmission control assembly 6 so that when the clip 106 engages the head 100 it holds the switch assembly 2 firmly against the rear plate 4. The flange 83 engages the lower edge 98 of the rear plate 4 to prevent any angular movement of the switch assembly 2.

A switch assembly according to the invention may be incorporated in a standard push-button transmission control assembly without modification except for forming of the mounting aperture 104 in the rear housing plate 4 in a proper location. Normally, sufficient "play," or lost motion is provided in the operator bars of such standard assemblies to actuate the switch assembly. It is generally desirable and preferable, however, to provide a lost motion arrangement in the transmission control assembly between the main shaft 19 and the abutment shoulders 40 and 42 of the neutral operator bar 18 to insure positive operation of the starter switch 52. Figs. 2, 3, 4 and 9 illustrate one suitable lost motion arrangement to insure a fully adequate over-travel of the shaft 19 to move the actuating arm 62 after the abutment shoulders 40 and 42 of the operator bar 18 are pressed into full engagement with the treadle bar 10. This arrangement comprises forming the operator bar assembly 18 in two separate members, viz: a shaft member 19 and a cross member 21. One end of the shaft member 19 extends slidably through the slot 50 in the rear plate 4 of the control assembly, and the other end extends through a comparable slot 51 in the face plate 53 of the transmission control assembly 6 and is connected to the push button 34. The cross member 21 comprises two plates 25 and 27 separated by and rigidly attached to a pair of abutment shoulder members 41 and 43. The shaft member 19 fits between the plates 25 and 27 in the space between the shoulder members 41 and 43, and is held in operative engagement with the cross member 21 by a pair of coil springs 108 which are fitted upon transverse pins 110 and 112. One pin 110 is fitted through a pair of coaxial apertures 114 in the plates 25 and 27 and extends through a relatively large, lost motion aperture 116 in the shaft member 19. The other pin 112 is held by the springs 108 against a shoulder 115 of the shaft member 19.

In operation, when the shaft 19 is advanced, force is transmitted from it to the cross member 21 through the springs 108 to advance the shoulder members 41 and 43 to position the treadle bar 10. When the abutment shoulders 40 and 42 are firmly seated against the treadle bar 10, the cross member 21 cannot move farther forwardly, but the shaft member 19 may still be advanced further to actuate the double throw switch 52, the difference in motion between the shaft member 19 and the cross member 21 being taken up by stretching of the springs 108. The overtravel of the shaft 19 is limited both by the permissible extent of movement of the actuating arm 62 of the double throw switch 52 and by the size of the aperture 116 in the shaft member 19 through which the pin 110 passes. The aperture 116 should be sufficiently large to accommodate the full permissible travel of the actuating arm 62.

The switch assembly 2 is positioned upon the rear housing plate 4 of the control assembly so that the switch actuating arm 62 is in direct line with the neutral operator bar 18 of the control assembly. The arm 62 is positioned sufficiently far from the rear housing plate 4 to allow the operator bar 18 to be fully extended to swing the treadle bar 10 to its desired position and to be latched by the latch 48 without contacting the arm 62. When normally operated, the operator bar 18 does not touch or move the arm 62 of the switch. When it is desired to energize the starter motor relay, however, the operator bar 18 may be advanced beyond its normal operative position to move the switch arm 62 thus to change the position of the double throw switch 52. To operate the vehicle, therefore, it is only necessary to turn on the ignition switch and to press the neutral push button of the transmission control assembly beyond its treadle bar engaging position, through a small overtravel to energize the starting motor relay to start the engine of the vehicle. Once the engine is started the vehicle may be operated conventionally.

A second embodiment of the invention is shown in Figs. 15–19, and includes a switch generally designated 120 and adapted to be mounted upon the inwardly, or rearwardly facing surface of the rear housing plate 4 of a push button transmission control assembly such as the assembly 6' illustrated in Fig. 15 or the assembly 6, hereinabove described. The showing of the modified form of push-button assembly 6' is illustrative only and is intended in no way to limit the scope of the invention, the switch assembly 120 being equally useful in conjunction with many other forms of push-button transmission actuating devices.

The switch 120 is adapted to be connected in a circuit to control the starter motor of the vehicle, and closes the circuit only after a double actuation of the neutral push button 34, i.e., the circuit is closed only after the neutral push button 34 is fully advanced, released and then pressed again. With this arrangement, the starter motor cannot be accidentally energized merely by a "follow through" of the neutral push button when the transmission is shifted from a drive position to neutral. In order to energize the starter motor through the switch 120, the neutral push button 34 must first be fully advanced, and released so that it retracts slightly, then advanced fully again. This second advance, but not the first, is effective to operate the switch 120.

The switch 120 includes a generally channel, or U-shaped frame 122 upon which the component parts of the switch are mounted and by which the switch 120 is secured to the rear wall 4 of the push-button assembly 6'. A pair of insulating slide members 124 and 126 which may be made of a molded resin are mounted, side by side, in longitudinal guideway apertures 128 and 130, respectively, formed in the web portion 132 of the frame 122. The slide members 124 and 126 are retained in the apertures 128 and 130 by spring clips 129 and 131, respectively, which engage the slide members by means of grooves (not designated) formed in the slide members. The frame 122 also includes a side wall 134 extending along its length and made of an insulating material, preferably of a fibre reinforced resin of substantial strength, such as Micarta. Three contacts 136, 138 and 140 are mounted upon this side wall 134 spaced along the length of the frame 122 and facing inwardly toward the slide members 124 and 126. The contacts 136, 138 and 140 extend through the wall 134 and are connected to electrical lead wires 137, 139 and 141, respectively. A cover member 143 is attached to the frame to protect the exteriorly extending portions of the contacts 136, 138 and 140.

The first slide member 124 may be called the actuator slide because it actuates and controls the operation of the second slide member 126, which may be called the contact slide. The contact slide 126 is mounted in the guideway 130 adjacent to the side wall 134 and carries a laterally projecting contact plate 142 which is urged outwardly against the contacts 136, 138 and 140 by a pair of compression coil springs 144 seated in sockets 146 in the contact slide. The contact plate 142 is partially recessed in the contact slide 126 within a recess 148 to prevent its escape and to hold it in a fixed position in latching spring members 181 are secured to the cross member 21', and the slot 186 permits the shaft 19' to be partially retracted after the cross member 21' has been fully advanced and latched in engagement with the treadle bar 10. This partial retraction is, of course, automatically effected upon release of the neutral push button 34, by the combined urgings of the operator bar biasing spring 26, and the actuator slide biasing spring 162. The length of the slot 186 is sufficiently greater than the diameter of the drive pin 188 to allow the actuator slide 124 to retract at least as far as shown in Fig. 18 when the neutral push button 34 is released, and thus to insure that the pawl 157 will be automatically positioned to engage the notch 158 as heretofore described.

The switch 2 may be conveniently mounted upon the inner side of the rear wall 4' of the assembly 6' by a pair of studs 190 secured to the forward leg 123 of the frame 122. These studs 190 may be inserted through a pair of apertures 192 in the rear wall 4' and secured therein by nuts 94, the switch being positioned to align the actuator slide 124 with the neutral operator bar 18', and to avoid inadvertent actuation of the contact slide 126 by any of the operator bars.

There are thus been described improved electrical switching means cooperative with and embodied in a vehicle transmission control assembly of the type having a separate operator member for each position of the controlled transmission. The apparatus facilitates engine starting and is particularly convenient when a vehicle is stalled in traffic.

What is claimed is:

1. An electrical switch including a base adapted to be mounted upon an automotive transmission control assembly of the type having a separate movable operator for each position of the controlled transmission, said switch comprising three spaced, fixed contacts insulatingly mounted on said base and aligned with respect to one another, an insulating slide member slidably mounted on said base for limited longitudinal travel thereon adjacent to said contacts, a contact plate mounted upon said slide member and positioned adjacent to said contacts, said contact plate being of a length sufficient to contact either adjacent pair of said contacts, means to urge said contact plate toward said contacts, yieldable means to urge said slide member toward one limit of ite travel on said base, an actuating slide slidably mounted on said base for limited longitudinal travel thereon parallel and adjacent to said slide member, a retractable pawl mounted on said actuating slide, said slide member defining a notch and being thereby drivingly engageable by said pawl, and means to advance and retract said pawl into and out of said notch in response travel of said actuating slide.

2. An electrical switch including a base adapted to be mounted upon an automotive transmission control assembly of the type having a separate movable operator for each position of the controlled transmission, said switch comprising a movable contact member mounted on said base, a movable actuating member mounted on said base, a retractable pawl carried by said actuating member, said contact member defining a notch engageable by said pawl, and means to advance and retract said pawl into and out of said notch in response to movement of said actuating member.

3. An electrical switch including a base adapted to be mounted upon an automotive transmission control assembly of the type having a separate movable operator for each position of the controlled transmission, said switch comprising three spaced, fixed contacts insulatingly mounted on said base and aligned with respect to one another, an insulating slide member slidably mounted on said base for limited longitudinal travel thereon adjacent to said contacts, a contact plate mounted upon said slide member and positioned adjacent to said contacts, said contact plate being of a length sufficient to contact either adjacent pair of said contacts, means to urge said contact plate toward said contacts, yieldable means to urge said slide member toward one limit of its travel on said base, an actuating slide slidably mounted on said base for limited longitudinal travel thereon parallel and adjacent to said slide member, a retractable pawl mounted on said actuating slide, said slide member defining a notch and being thereby drivingly engageable by said pawl, and means to advance and retract said pawl into and out of said notch in response to travel of said actuating slide, said last named means including spring means to urge said pawl toward said slide member, and a trigger member cooperative with said pawl to restrain it against said spring means when it is retracted away from said slide member, said trigger member being longitudinally slidably mounted upon said actuating slide and having an elongated portion aligned with and longer than said actuating slide, said base including motion limit portions to limit the travel of said trigger with respect to said base to a smaller distance than the travel of said actuating slide.

4. An electrical switch for an automotive trasmission control assembly, siad switch comprising a base, three electrical contacts insulatingly mounted on said base, a contact member shiftably mounted on said base, said contact member having portions electrically bridging a first and second of said contacts upon shifting of said contact member to one position and having portions electrically bridging said first and a third of said contacts upon shifting of said contact member to a second position, means yieldingly urging said contact member to said one position, an actuating member shiftably mounted on said base, a retractable pawl mounted on said actuating member, said contact member defining a notch drivingly engageable by said pawl upon shifting of said actuating member in one direction, and means for advancing and retracting said pawl into and out of said notch in response to shifting of said contact member.

5. An electrical switch for an automobile transmission control assembly, said switch comprising a base, a movable contact member mounted on said base, a movable actuating member mounted on said base, a retractable pawl carried by one of said members, the other of said members defining a notch engageable by said pawl, means to advance and retract said pawl into and out of said notch in response to movement of said actuating member, said last named means including spring means to urge said pawl toward said other member, and a trigger member cooperative with said pawl to restrain the latter against said spring means when said pawl is retracted away from said other member, said actuating member being movable with respect to said trigger member to move said pawl from the restraint of said trigger member.

6. In combination with an automotive gear shift control device selectively shiftable to various operating positions including a neutral position and a reverse position, a switch assembly comprising a self-contained unit including a body member mounted on said control device, first and second electrical terminals mounted in said body member for an electrical accessory circuit and a starting motor circuit respectively, an electrically powered single-pole double-throw switch contact, an actuating member mounted in said body member and having said switch contact thereon to shift the latter, means yieldingly urging said actuating member to shift said switch contact into electrical contact with said first terminal, said actuating member having an outer projection arranged to be selectively moved by said control device to shift said switch contact into electrical contact with said second treminal when said control device is shifted to said neutral position, a third electrical terminal mounted in said body member and electrically connected with said switch contact, a single-pole single-throw switch contact mounted in said body member and having a unitary projection arranged to be moved by said control device to shift the last-named switch contact into electrical contact with said third terminal when said control device is shifted to said reverse position, and means yieldingly urging said last-named switch contact out of electrical contact with said third terminal.

References Cited in the file of this patent

UNITED STATES PATENTS

| | | |
|---|---|---|
| 1,169,174 | McLauthlin | Jan. 25, 1916 |
| 1,814,242 | Chryst et al. | July 14, 1931 |
| 1,854,919 | Amos | Apr. 19, 1932 |
| 1,973,096 | Norton | Sept. 11, 1934 |
| 1,986,527 | Rach et al. | Jan. 1, 1935 |
| 2,234,405 | Hall et al. | Mar. 11, 1941 |
| 2,431,904 | Andrews | Dec. 2, 1944 |
| 2,442,766 | Garvin | June 8, 1948 |
| 2,489,544 | Schwarz et al. | Nov. 29, 1949 |
| 2,514,963 | McRae | July 11, 1950 |
| 2,552,789 | Hopkins | May 15, 1951 |
| 2,610,518 | Goedeke et al. | Sept. 16, 1952 |
| 2,622,138 | Cooper | Dec. 16, 1952 |
| 2,647,178 | Handy | July 28, 1953 |
| 2,740,004 | Baldasare | Mar. 27, 1956 |

FOREIGN PATENTS

| | | |
|---|---|---|
| 730,963 | Great Britain | June 1, 1955 |

OTHER REFERENCES

Automotive Industries, pp. 48 to 49, Nov. 1, 1955.